April 21, 1931.  C. W. BURROWS  1,801,328
APPARATUS FOR TESTING MAGNETIZABLE MATERIAL
Filed Jan. 4, 1924    2 Sheets-Sheet 1
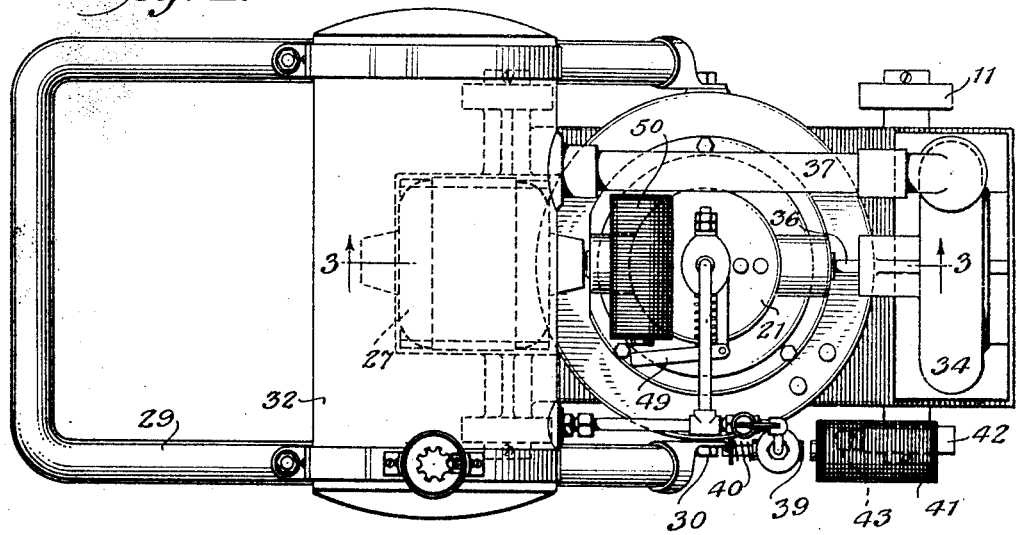
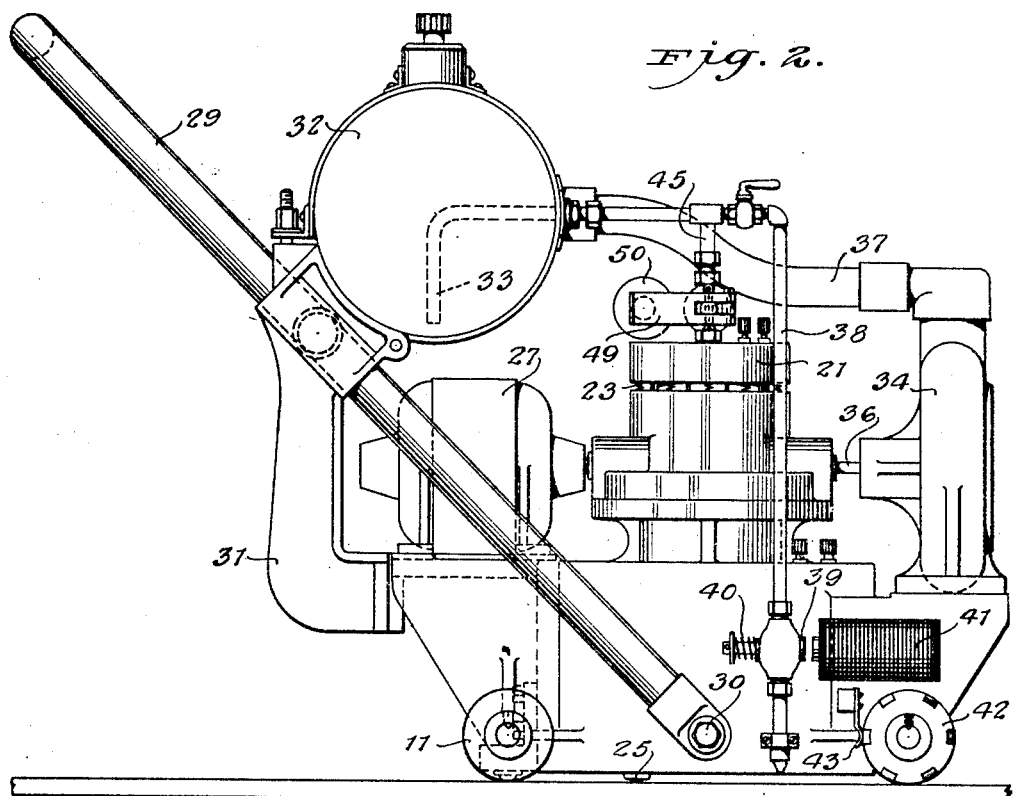
INVENTOR
Charles W. Burrows
BY
ATTORNEY

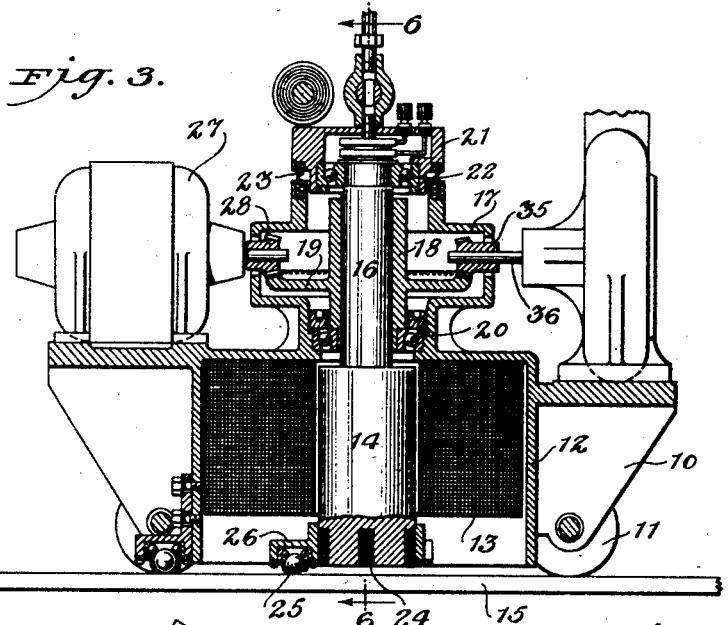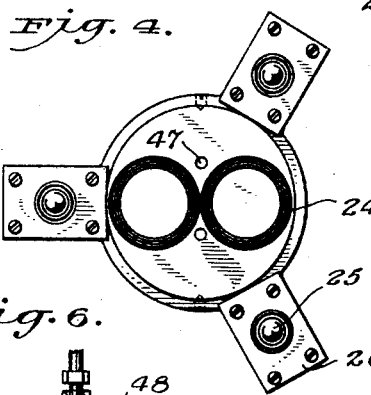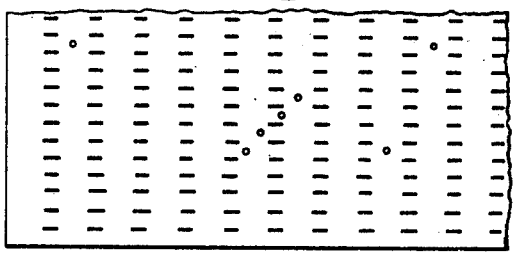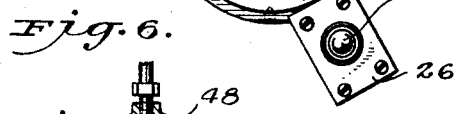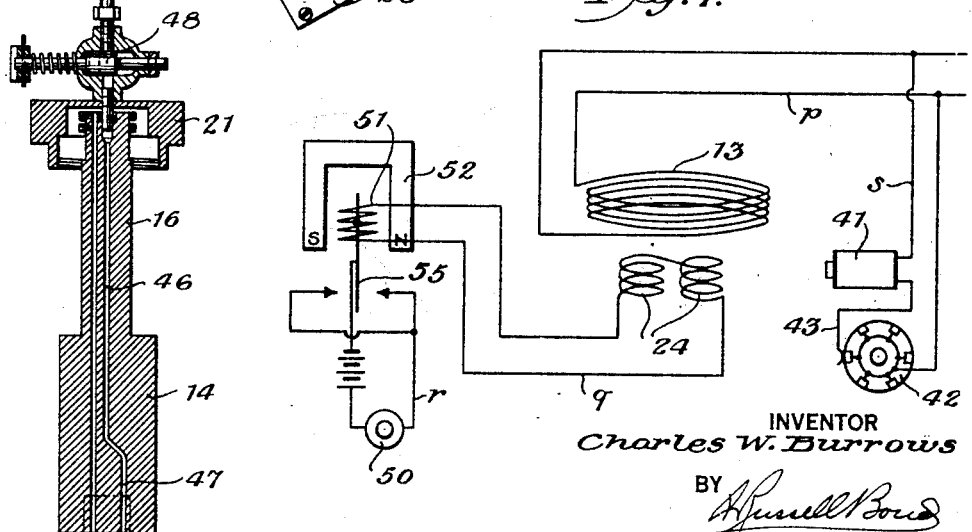

Patented Apr. 21, 1931

1,801,328

UNITED STATES PATENT OFFICE

CHARLES W. BURROWS, OF NEW YORK, N. Y., ASSIGNOR, BY MESNE ASSIGNMENTS, TO MAGNETIC ANALYSIS CORPORATION, OF LONG ISLAND CITY, NEW YORK, A CORPORATION OF NEW YORK

APPARATUS FOR TESTING MAGNETIZABLE MATERIAL

Application filed January 4, 1924. Serial No. 684,369.

This invention relates to improvements in apparatus for testing magnetizable material, particularly to a machine for testing sheets or plates of ferrous metal.

It is an object of the invention to provide a machine of this kind equipped with means for marking directly upon the material tested to indicate flaws or other defects in such material.

It is a further object to provide a machine which may be manually moved over the stock being tested and in which the marking apparatus is automatically controlled.

Another object of the invention is to outline generally with a marking medium, the position and contour of any defects or inhomogeneities such as blow holes, said holes, cracks, etc. found in the specimen undergoing test, so that when a sheet of stock is examined the whole sheet need not be condemned because of the presence of a defect in one part thereof. Often it may be found feasible to remove only the defective portion of the sheet of plate and use the remainder.

Further objects are the provision of testing and marking apparatus which will be simple and practical in construction, durable and efficient in use, and which may be handled successfully by an unskilled operator.

With these and other objects in view, the invention consists in certain novel features of construction and combinations and arrangements of parts as will be more fully hereinafter described and pointed out in the claims.

In the accompanying drawings:

Fig. 1 is a top plan view of my improved apparatus,

Fig. 2 is a view in side elevation thereof,

Fig. 3 is a vertical sectional view on the line 3—3 of Figure 1,

Fig. 4 is a bottom plan view of the core 14,

Fig. 5 is a fragmentary plan view of a tested and marked specimen,

Fig. 6 is a vertical sectional view through the core 14 on the line 6—6 of Fig. 3, and Fig. 7 is an electrical diagram.

Before proceeding to describe in detail the mechanism utilized, I shall outline briefly the method of testing employed. A magnetic field having a gap therein is used. A section of the material under test, which for purposes of the specification we may consider as a plate, is used to close the gap so that it forms part of the path of magnetic flux. The marking apparatus is controlled by the characteristics of the current induced in exploring coils in the field. Any flaws in the particular portion of the plate forming part of the path of magnetic flux will of course affect this induced current and consequently the marking apparatus will become operative to indicate the particular spot on the plate where the flaw occurs. The entire plate is subjected to this method of testing and all of the inhomogeneities are marked. As will be more fully explained hereinafter, the marking apparatus is operable only to indicate flaws which would be fatal to the purpose for which the plate is intended. Minor defects of no practical importance are disregarded with the commercial apparatus herein shown.

Referring now with particularity to the drawings, it will be noted that I have used reference character 10 to indicate a carriage equipped with traction wheels 11. The carriage is preferably formed from a single casting provided at its intermediate portion with an open-bottomed annular housing 12 wherein is located the primary or field producing coil 13 of my improved testing apparatus. A rotatable core 14 is vertically disposed within the center of the coil 13.

The carriage is adapted to be rolled over the surface of the plate to be tested. This plate is seen at 15 in Fig. 3. When the coil 13 is energized to produce a magnetic field, the path of magnetic flux will be through the core 14, housing 12, and that part of the plate 15 which is immediately below the housing, as will be readily understood.

The reduced upper end 16 of the core 14 is disposed within a gear case 17. The hub 18 of a crown gear 19 is keyed to the reduced end 16 of the core. Anti-friction bearings 20 support the lower end of the hub. The core 14 is hung from the cover 21 of the gear case, the core being suspended for rotary movement within the cover by a set of thrust bearings 22. The gear case cover 21 is supported upon the gear case by coiled expansion springs 23 having their ends pocketed in the cover and case respectively.

A pair of bucked exploring coils 24 are arranged in the lower end of the rotatable core 14. It is desirable that a uniform distance be maintained between these coils and the plate 15. Hence, the cover 21 from which the core is hung is yieldingly mounted on the gear case, the gear case supporting most of the weight of the core. The remainder of its weight is carried by roller bearings 25 interposed between the specimen 15 and radially extending feet 26 at the bottom of the core. By virtue of this construction, any unevenness in the surface of the specimen may be compensated for by the springs 23, the core riding upwardly through the hub of the crown gear.

Any suitable mechanism may be employed for rotating the core as the carriage is moved over the surface of the specimen. For purposes of illustration, I have shown an electric motor 27 supported upon the carriage and driving the crown gear through the intermediacy of a pinion 28. Obviously, any convenient train of speed reducing gears might be used between the motor and the rotatable core.

A handle 29 is used in moving the carriage about over the specimen. This handle is of general U-shape, its legs straddling the carriage and having their ends secured thereto in any approved manner, as at 30. Brackets 31 rising from the rear of the carriage (Figs. 1 and 2) serve to support a receptacle or tank 32, wherein a supply of liquid marking fluid (preferably paint) is stored. The brackets are attached to the intermediate portions of the legs of the handle, lending rigidity to the connection between the handle and the carriage.

The paint is led off from the tank 32 through a tip pipe 33, a force feed being employed. A casing 34 for a blower fan is mounted on the forward end of the carriage 10 and the fan is driven from the crown gear 19 through a pinion 35 on the drive shaft 36 of the fan. Air from the fan passes through a conduit 37 into the upper end of the tank 32, exerting pressure on the liquid within the tank and tending to force it through the dip pipe 33.

Two separate sets of paint spraying apparatus are used, one as heretofore noted marks upon the specimen wherever and whenever a flaw is discovered. The other is periodically operable to trace the path of the carriage over the specimen so that an operator may know just what part of the specimen has been inspected.

The periodically operable path marking apparatus is quite simple, and I shall describe the same first. Connected with the dip pipe 33 is a paint delivering pipe 38 discharging just above the specimen at one side of the carriage. A reciprocatory valve 39 in the pipe 38 is ordinarily held in retracted and closed position by a spring 40 (Fig. 2). An electro-magnet 41 supported adjacent the valve 39 is adapted when energized to attract the valve, sliding it to open position against the action of the spring 40. The magnet 41 forms part of a shunt circuit $s$ (Fig. 7) from the main line $p$ which energizes the coil 13. A rotary circuit breaker 42 serves as one of the traction wheels of the carriage and periodically closes the shunt circuit through a switch 43, thus energizing the magnet 41 and permitting a discharge of paint from the pipe 38. In Fig. 5, the interrupted parallel lines of marking show the manner in which successive movements of the carriage over the specimen have been traced.

The mechanical operation of the apparatus for marking defective spots in the specimen is substantially similar to that of the path marking means. A branch pipe 45 in communication with the dip pipe 33 delivers paint into a capillary conduit 46 (Fig. 6) in the core 14. The lower end of the conduit or passage 46 is offset as at 47, so that upon rotation of the core, a substantially circular mark will be made upon the specimen. The core is rotated at a great speed relative to the rather slow movement of the carriage. A valve 48 in the pipe 45 is normally spring held in closed position. The free end of a pivoted arm 49 (Fig. 1) is adapted when attracted by an electro-magnet 50 to engage the stem of the valve 48 and open the same, permitting a discharge of paint.

The means for controlling the electromagnet can be seen in the diagram of Fig. 7. The exploring coils 24 are bucked as before noted and form together with the moving coil 51 of a dynamometer 52 a closed secondary circuit $q$. When the specimen beneath the exploring coils is of homogeneous structure, there will be uniformity in the lines of force cutting the coils and consequently the E. M. F. generated in one coil will be neutralized by that generated in the other, and there will be no movement of the customary pointer 55 fixed to the moving coil 51 of the dynamometer, since there will be no current flowing through such coil. When, however, an inhomogeneity occurs in the specimen, the lines of force cutting one exploring coil will be disturbed and a difference in electro-motive forces between the two coils will result. If the movement of the pointer 55 consequent upon current flow through the moving coil 51 is great enough, the pointer will close a relay circuit $r$ and the electro-magnet forming part of this circuit will be energized. A circular mark or in any event a mark clearly distinguishable from the mark made by the periodical paint spraying apparatus will immediately be made upon the specimen. Several of such marks are shown in Fig. 5 indicating a crack or a flaw in the plate 15.

In view of the foregoing rather full explanation of the mode of operation of the various parts of the machine, it is believed that no further description of operation is necessary. The motor is operated from any suitable source of current. With the particular type of apparatus shown, direct current is used in energizing the primary coil 13. By slightly varying the form of magnet controlling devices, alternating current might be used. Since the core 14 is rotated at a high speed, the current induced in the secondary circuit will be an alternating current caused by the rapid successive shifting of the position of the exploring coils, first one coil and then the other will be affected by a blow hole. Thus, rapid changes in the direction of current flow in the coil 51 will occur. Consequently, a fluttering action will be imparted to the finger 15 which will, if of sufficient moment, close the relay circuit $r$.

Various slight changes and alterations might be made in the general form and arrangement of the parts described without departing from the invention, and hence I do not wish to limit myself to the precise details set forth, but shall consider myself at liberty to make such changes and alterations as fairly fall within the spirit and scope of the appended claims.

I claim:

1. A portable apparatus for testing magnetizable objects including a carriage, a primary coil mounted on said carriage, a rotatable core within said coil, and an exploring coil eccentrically carried by said core.

2. Apparatus for testing magnetizable objects including a carriage adapted to be moved over the object to be tested, means associated with said carriage for producing a magnetic field of which a portion of the object below the carriage forms a part, exploring coils in said field, means for maintaining a uniform distance between the exploring coils and said object, and a rotatable carrier for said exploring coils.

CHARLES W. BURROWS.